United States Patent
Rodriguez

(10) Patent No.: US 10,475,111 B1
(45) Date of Patent: *Nov. 12, 2019

(54) SELECTING AND CONFIGURING METRICS FOR MONITORING

(71) Applicant: Amazon Technologies, Inc., Seattle, WA (US)

(72) Inventor: Sebastien Alexandre Roland Rodriguez, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/745,129

(22) Filed: Jun. 19, 2015

(51) Int. Cl.
*G06F 15/173* (2006.01)
*G06Q 30/06* (2012.01)
*H04L 12/26* (2006.01)

(52) U.S. Cl.
CPC ......... *G06Q 30/0641* (2013.01); *H04L 43/06* (2013.01); *H04L 43/08* (2013.01)

(58) Field of Classification Search
None
See application file for complete search history.

(56) References Cited

U.S. PATENT DOCUMENTS

| 8,707,194 B1 | 4/2014 | Jenkins et al. |
| 2003/0135382 A1 | 7/2003 | Marejka et al. |
| 2003/0140150 A1 | 7/2003 | Kemp et al. |
| 2004/0103186 A1 | 5/2004 | Casati et al. |
| 2007/0300215 A1 | 12/2007 | Bardsley |
| 2008/0235075 A1* | 9/2008 | Couture ............. G06F 11/3495 709/224 |
| 2009/0271324 A1* | 10/2009 | Jandhyala ........ G06Q 10/06375 705/80 |
| 2010/0229185 A1 | 9/2010 | Howarth |
| 2012/0151396 A1 | 6/2012 | S. et al. |
| 2012/0260248 A1* | 10/2012 | Katiyar ............... G06F 9/45533 718/1 |
| 2014/0058871 A1* | 2/2014 | Marr ................... G06F 9/45533 705/26.1 |
| 2014/0201642 A1* | 7/2014 | Vicat-Blanc ........... H04L 41/22 715/736 |

OTHER PUBLICATIONS

Office action for U.S. Appl. No. 14/745,070, dated Apr. 6, 2017, Rodriguez, "Selecting and Configuring Metrics for Monitoring", 16 pages.

(Continued)

*Primary Examiner* — Padma Mundur
(74) *Attorney, Agent, or Firm* — Lee & Hayes, P.C.

(57) ABSTRACT

Technologies are disclosed herein for selecting and configuring metrics to monitor. The metrics available for monitoring are associated with computing resources provided by a service provider network. Instead of requiring a customer to manually determine the metrics that may be monitored, the service provider network may dynamically determine the metrics available for monitoring based on the infrastructure specified by the customer to execute in the service provider network. In this way, customers may not only select metrics related to the health of the computing devices (physical or virtual), the customer may also select metrics related to the software applications executing on the computing devices.

20 Claims, 11 Drawing Sheets

(56) References Cited

OTHER PUBLICATIONS

Web article: "collectd", published by Wikipedia, [online] [retrieved on Jun. 19, 2015] retrieved from: http://en.wikipedia.org/wiki/Collectd, 3 pps.

Website: "collectd.org" [online] [retrieved on Jun. 19, 2015] retrieved from: http://collectd.org/, 2 pps.

Office action for U.S. Appl. No. 14/745,107, dated Aug. 10, 2017, Rodriguez, "Selecting and Configuring Metrics for Monitoring", 25 pages.

Office Action for U.S. Appl. No. 14/745,070, dated Oct. 19, 2017, Rodriguez, "Selecting and Configuring Metrics for Monitoring", 19 pages.

Office Action for U.S. Appl. No. 14/745,070, dated Mar. 12, 2018, Rodriguez, "Selecting and Configuring Metrics for Monitoring", 22 pages.

Office Action for U.S. Appl. No. 14/745,107, dated Oct. 17, 2018, Rodriguez, "Selecting and Configuring Metrics for Monitoring", 28 pages.

Office Action for U.S. Appl. No. 14/745,107, dated Jun. 15, 2018, Rodriguez, "Selecting and Configuring Metrics for Monitoring", 28 pages.

Office Action for U.S. Appl. No. 14/745,070, dated Jul. 18, 2018, Rodriguez, "Selecting and Configuring Metrics for Monitoring", 25 pages.

Office Action for U.S. Appl. No. 14/745,107, dated Dec. 28, 2018, Rodriguez, "Selecting and Configuring Metrics for Monitoring", 20 pages.

* cited by examiner

SELECTING AND CONFIGURING METRICS FOR MONITORING

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can define computing infrastructures and create custom solutions that provide various types of functionality, such as application hosting, backup and storage, content delivery, World Wide Web ("Web") hosting, enterprise information technology ("IT") solutions, database services, and others.

It can sometimes be difficult for customers, or potential customers, of computing service providers such as those described above to monitor the operation of computing resources. For example, a significant amount of manual technical effort may be required to define and set up the monitoring for the different computing resources. The technical effort required to define the monitoring may be costly and time consuming and might, therefore, present a significant barrier to the utilization of monitoring that may be available to customers.

DETAILED DESCRIPTION

Figure 1:
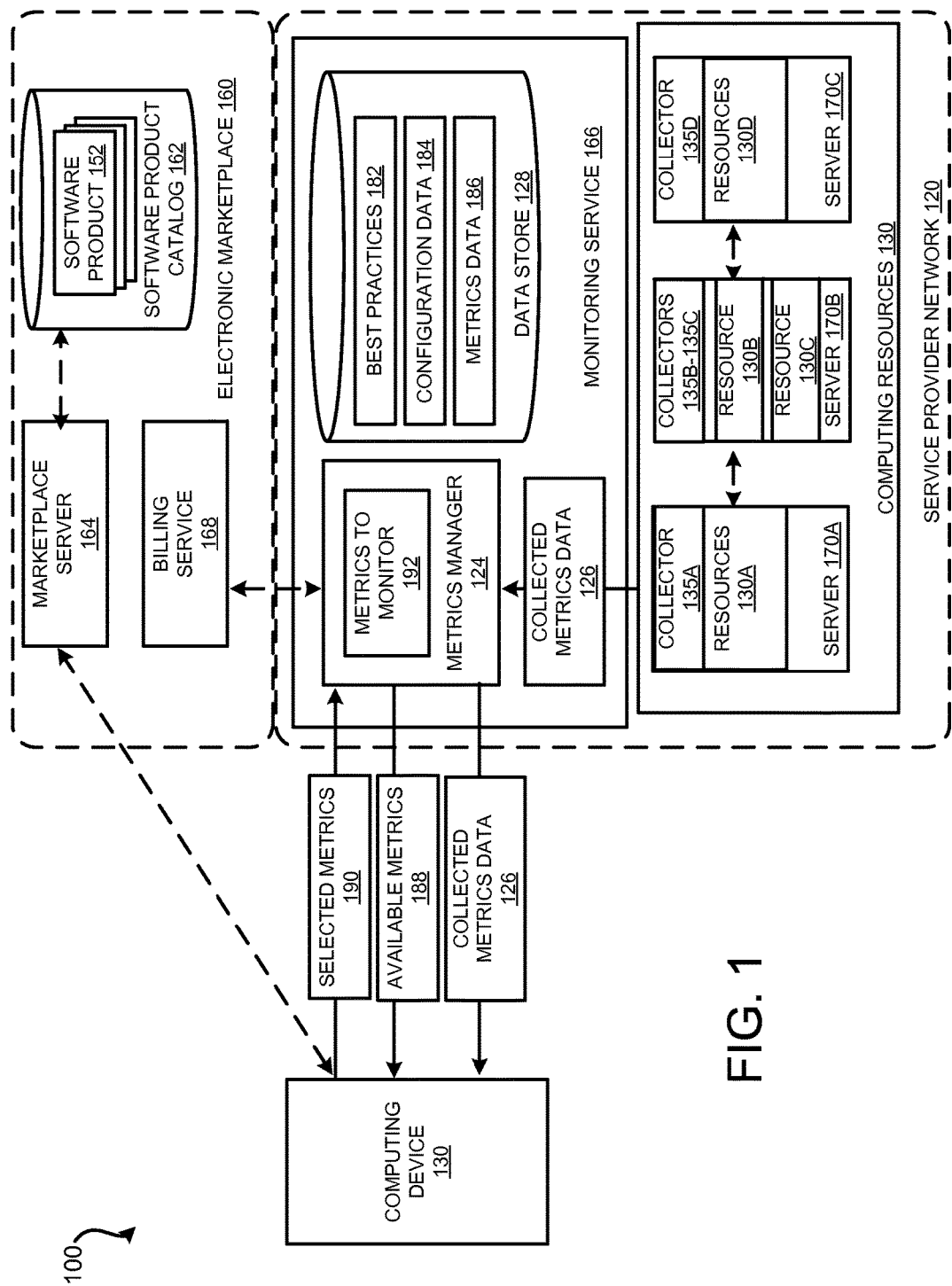
FIG. 1 is a block diagram depicting an illustrative operating environment for selecting and configuring metrics to monitor within a service provider network.

The following detailed description is directed to technologies for selecting and configuring metrics to monitor. For example, metrics that are available for monitoring may be associated with computing resources provided by a service provider and execute within a service provider network. Some example metrics that may be monitored are associated with resources such as, but not limited to virtual computing resources that are utilized as execution environments (e.g., virtual machines or containers), database resources, storage resources, security resources, auto-scaling resources, networking resources, and the like. Instead of requiring a customer to manually determine the metrics that are available for monitoring, the service provider network may dynamically determine the metrics available for monitoring based on the infrastructure specified by the customer to execute in the service provider network. In this way, customers may not only more easily select metrics related to the health of the execution environments (e.g., virtual computing devices or physical computing devices) the customer may also select metrics related to the software applications executing in the execution environments.

The metrics that are available for monitoring may be determined from data associated with the computing resources or some other data source. For example, all or a portion of the computing resources may have a list of metrics that may be monitored. In some examples, a collection daemon may include a list of the metrics that may be monitored for the different computing resources that are supported for monitoring by the daemon. In some configurations, best practices that are associated with an execution environment, software product, and/or software service might also be used when determining the available metrics that may be monitored.

Best practices for an execution environment, a software product or service might refer to different metrics recommended for use in the execution environment, software product or service that have been shown, or are believed, to be useful in determining an efficient use of the execution environment, a software product or service. For example, the best practices for a load balancing product might indicate that a load balancer metric that measures a number of requests might be useful when the load balancing software product is being used to service more than a hundred customers. The best practices might be supplied by a software provider and/or some other entity (e.g., a reviewing service, the service provider, or some other user familiar with the operation of the execution environment, a software product or service). All or a portion of these metrics may be provided to the customer. For example, the metrics for the computing resources executing in the service provider network on behalf of a customer may be provided in a graphical user interface (GUI) that displays the available metrics.

After the service provider network provides the available metrics, the customer may select the metrics to monitor. For example, the customer may select the metrics to monitor from the GUI, or some other interface, that displays the available metrics. In some examples, the customer might obtain more information about the metric before selecting the metric for monitoring. For instance, upon selection of an available metric, a GUI may be updated to show actual metric data collected from computing resources executing in the infrastructure defined by the customer (e.g., data from the last five minutes) for the selected metric. In other examples, a snapshot of actual metric data may be presented with the display of the available metrics. In this way, the customer may view actual metrics data obtained from the defined infrastructure in order to assist the customer in determining whether to select the metric for monitoring.

In some configurations, the customer may select to purchase one or more of the available metrics from the GUI. For example, the customer might select a single user interface element to purchase and configure a metric for monitoring. As used herein, a "purchase" may result in no payments from the customer (e.g., a free trial), a one-time payment from a customer, or may result in payments from a customer that are made on an ongoing basis. In some examples, a purchase of a metric, alarm, some other computing resource, or software product establishes a subscription that allows the customer to use the purchased product (e.g., metric, alarm, and/or software product) at a specified usage fee. The specified usage fee may be based on different factors such as a frequency of the monitoring or alarm, a time the software product is executed, a number or type of resources used by the software, a number of operations performed by the software product, and the like. As used herein, the term "software product" may refer to software and/or software services. For example, a software product may be an application, a machine image, or software as a service ("SaaS"). The software product may be available from an electronic marketplace and may be executed in a service provider network.

After a metric is purchased, the service provider network may configure the selected metric for monitoring. For instance, instead of requiring the customer to modify a configuration file, or set some other setting, the service provider network may configure the configuration file (or other settings) on behalf of the customer. According to some configurations, the service provider network modifies a configuration file to specify that the selected metrics are to be monitored from within the service provider network and instructs a monitoring agent within the service provider network to begin the monitoring of the selected metrics. In some examples, data related to the purchased metric is displayed within a graphical user interface for the customer to view. Additional details regarding the various components and processes described above relating to selecting and configuring metrics to monitor will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 for selecting and configuring metrics to monitor within a service provider network. In some examples, the metrics may be associated with measurements of characteristics provided by computing resources that execute within the service provider network 120. The computing resources may be associated with a service provider and/or computing resources provided by third party software providers. For example, the metrics may be associated with execution environments, such as containers or virtual machines, and/or other software applications or services that execute within the service provider network 120. The metrics may also be associated with third party software products such as network products, database products, business products, as well as other products.

The metrics may measure different characteristics that are associated with the execution of a computing resource. For example, the metrics might measure CPU performance, disk usage, bandwidth used, memory usage, number of writes performed, number of reads performed, number of operations performed, types of operations performed, and the like. Generally, each computing resource may be associated with a list of metrics that may be monitored from within the service provider network 120. For example, a database application may have metrics related to performing database operations, whereas a network application may have metrics related to transferring data across a network. The list of metrics that are supported for measuring may be stored in the metrics data 186 within the data store 128, or at some other location.

As illustrated in FIG. 1, the operating environment 100 includes one or more computing devices 130, in communication with the service provider network 120. In some configurations, a customer of a service provider may utilize the computing device 130 to select one or more software products 152 for execution within the service provider network 120. According to some examples, the service provider, a third party software provider, or some other software provider, may submit one or more software products 152 (e.g., virtual machine images) to the electronic marketplace 160. The electronic marketplace 160 may then make the submitted software product 152, as well as other software products 152 submitted to the electronic marketplace 160, available to customers.

As used herein, the terms "customer" and "customers" refer to existing customers of the electronic marketplace 160 and/or the service provider network 120 as well as visitors (i.e. potential customers) to the electronic marketplace 160 and/or the service provider network 120. In some examples, a third party software provider, or a third party metric provider, may be considered a customer of the electronic marketplace 160 and/or the service provider network 120 since the third party software provider or the third party metric provider may not be an owner or operator of either the electronic marketplace 160 and/or the service provider network 120. A third party metric provider may provide metrics to the service provider network 120 that may be made available for purchase (e.g., through the electronic marketplace 160) by one or more customers of the service provider network 120.

Illustratively, the marketplace server 164 may generate one or more user interfaces, through which a customer, utilizing the computing device 130, or some other computing device, may browse software products 152, submit queries for matching software products and view information and details regarding specific software products. A customer of the service provider network may purchase the software product 152 from the electronic marketplace 160, configure the software product 152 and launch the software product 152 in a hosted computing environment (e.g., the service provider network 120) in a single interaction or order placed with the electronic marketplace 160. According to another example, the hosted computing environment may be a different network, such as a software provider network.

According to an example, the marketplace server 164 establishes an account for the customer. The account information may include a variety of different information, such as one or more payment methods, billing preferences, address information, communication preferences, privacy preferences, and the like. This information might be obtained by the marketplace server 164 and provided to the billing server 168. The billing server 168 may also be configured to process payments from customers and, in some examples, provide payment to the software providers of the software products and/or metrics data. The billing server 168 may be configured to store data about what portion of a payment received by a customer for use of a software product is provided to the software provider and what portion is provided to the electronic marketplace 160 and/or the service provider network 120.

As described in more detail below, the service provider network 120 may include a collection of rapidly provisioned and, potentially, released computing resources hosted in connection with the marketplace or a third party provider. Customers of the service provider network 120 may purchase and utilize computing resources 130 such as computing resources 130A-130C, from a service provider on a permanent or as-needed basis. The computing resources 130 may include a number of computing, networking and storage devices in communication with one another. In some configurations, the computing resources 130 may correspond to physical computing devices. In other configurations, the computing resources may correspond to virtual machine instances, implemented by one or more physical computing devices, such as the servers 170A-170C.

Some of the computing resources are configured to operate as physical computing devices, such as virtual machine instances, containers, and other types of execution environments. A service provider might also offer other types of resources 130 for purchase and use by customers. For example, a service provider might offer file or block data storage resources, database resources, networking resources, such as load balancing resources, domain name service ("DNS") resources, virtual networking resources, security resources 180 and/or other types of resources 182 on a permanent or as-needed basis. As described in more detail below, all or a portion of the computing resources 130 may have metrics that may be monitored by the monitors 135. The computing resources may also be configured to execute one or more software products and/or other types of software. The service provider may also offer for sale metrics for computing resources.

The service provider operating the service provider network 120 might also charge a fee for operating the resources 130 that the customer uses within the service provider network 120. The fee charged for a particular resource 130 might be based upon the type and/or configuration of the resource 130. The fee charged for a particular resource 130 might also be based upon the amount of time the resource 130 is utilized. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources 130 might also be based upon other considerations. In some configurations, the service provider may also charge for the delivery of metrics data 126 for the selected metrics 190 that the customer selects to monitor. A service provider might also utilize various purchasing models to determine the amount to charge a customer for use of resources 130 provided by the service provider.

The various resources 130 might also be provisioned and de-provisioned as needed in an automated fashion. For example, a customer might submit a request to the service provider network 120 to instantiate a new instance of a computing resource 130, such as an instance of a virtual machine. In response to receiving such a request, or one or more components within the service provider network 120, might create the new instance of the virtual machine as requested by the customer. The customer may then be permitted to utilize the new instance of the virtual machine as desired. Other types of computing resources might be instantiated in a similar fashion.

When a customer has finished using a computing resource 130, such as a virtual machine instance, the customer may request that the resource 130 be de-provisioned. In response thereto, a component in the service provider network 120, may cause the computing resources 130 to be de-provisioned. Other types of computing resources 130 might also be provisioned and de-provisioned in a similar manner. When a resource is de-provisioned, the metrics manager 124 may stop the monitoring of the selected metrics 190 that were associated with the de-provisioned resource. The service provider network 120 might also provide functionality for automatically scaling and/or de-scaling resources 130 based upon demand for the computing resources 130 or other factors.

In some examples, customers may define an infrastructure that defines the resources 130 used by an application that executes within the service provider network 120, and possibly other networks (not shown). For instance, a customer might be interested in creating an application that includes computing resources, such as web servers that auto-scale, a load-balancer, a firewall, and a data storage service.

In some examples, the configuration data 184 may be used by the metrics manager 124, another component, or some other computing device, to generate a deployment template (not shown). The deployment template might be implemented utilizing JavaScript Object Notation ("JSON") language, a text file, or some other suitable language. In some configurations, the deployment template may be used to provision the identified resources in the service provider network 120, and possibly other networks. For example, a component within the service provider network 120, such as the metrics manager 124, may utilize the deployment template specified in the configuration data 184 to provision and instantiate the defined resources in the service provider network 120.

As illustrated in FIG. 1, the monitoring service 166 includes a metrics manager 124, and a data store 128. While the metrics manager 124, and the data store 128 are illustrated within the monitoring service 166, all or a portion of these components may be located in other locations. For example, the data store 128 may be located externally from the monitoring service 166 at some other location in the electronic marketplace 160 or the service provider network 120. Similarly, the metrics manager 124 may be part of another service or computing device, such as the marketplace server 164, and the like.

As discussed above, the metrics manager 124 included in the monitoring service 166 may be configured to determine the metrics available to monitor, monitor (or instruct) the selected metrics 190 to be monitored and provide the collected metric data 126 to the computing device 130. In some examples, the metrics that are not already selected for monitoring and are available for monitoring by a customer may be selected by the metrics manager 124 when generating the available metrics 188.

The metrics that are selected as available metrics might be selected by the metrics manager 124 using different mechanisms. For example, the available metrics 188 might be based on an analysis of the customers' environments, such as what hardware is deployed, what software is deployed, and what services the environment uses. As additional examples, the available metrics 188 that are selected by the metrics manager 124 might be based on a listing of the metrics available to be monitored (e.g., stored within the metrics data 186), best practices data 182, a popularity of the metrics, reviews of the metrics, or the like. The popularity of the metrics might be based on customers in the service provider network that have similar profiles.

As discussed above, best practices may refer to different metrics for an execution environment, software product or service that have been shown, or are believed, to be useful in determining an efficient use of the execution environment, a software product or service. The best practices 182 might be supplied or determined by the metrics manager 124, a software provider and/or some other entity (e.g., a reviewing service, the service provider network 120, or some other user familiar with the operation of the software product).

In some examples, customer data obtained from the service provider network 120 is used to determine the best practices 182. For example, configuration settings set by customers of the service provider network 120 for different computing resources 130, and combination of computing resources 130, may be accessed to determine metrics that are commonly selected and utilized by customers. In some examples, a top number of metrics (e.g., top 2%, 5%, or the like) that are utilized by other customers may be identified to include in the best practices data 182.

According to some configurations, the customer data used to determine the metrics for the best practices 182 may be based on customers that have a similar profile to the customer utilizing the computing device 130. For example, the metrics manager 124, or some other user or component, may identify other customers that are in the same type of business (e.g., banking, software-as-a-service, or the like) and determine the metrics that are commonly selected by the identified customers. In other examples, the customers that are determined to be similar may be based on other factors, such as but not limited to the number of employees of a business associated with the customers, an average amount of money spent for the use of the computing resources 130, an average time spent using the computing resources 130, and the like. According to some configurations, the service provider network 120 removes any personally identifiable information ("PIP") relating to the customers of the service provider network before providing data to a customer. In other words, the data is anonymized before being provided to a third party customer.

Before providing the available metrics 188 to the computing device 130 for selection, the metrics manager 124 may prioritize the available metrics 188 based on various criteria. For example, the metrics 188 may be presented based on cost, reviews, likeliness of use, and the like. The metrics manager 124 might also utilize usage information when selecting the metrics to provide to the customer. For example, the available metrics 188 might be based at least, in part, on how many other customers are utilizing a metric with a particular resource. In some configurations, the manager 124 may select a top number of metrics as available metrics 188 (e.g., the top 2, 5 or 10 for a particular computing resource). For example, if there are one metrics that are determined to be available for monitoring based on the infrastructure of the customer, the metrics manager 124 may determine the metrics that are ranked the highest according to specified parameters (e.g., cost, use) of the customer. For example, it may be determined that certain metrics (or data from those metrics) are more active (e.g., outputting the most data) or are viewed more frequently by the customer, in which cases those metrics may be ranked higher than other metrics. In some instances, the metrics manager 124 may rank the metrics that are candidates for monitoring and select a specified number of the metrics as the available metrics 188 that are provided to the computing device 130.

The available metrics 188 might be provided by the metrics manager 124 to a customer using different mechanisms. For example, the available metrics 188 might be provided in a GUI, stored in a document, delivered in a message (e.g., email, SMS, user interface), or provided in another manner. For example, a message could be sent to the customer with the recommendations. A user interface, such as the GUI 300 illustrated in FIG. 3A or the GUI 325 illustrated in FIG. 3B, might be used by the customer to view and interact with the available metrics 188.

After the available metrics 188 are provided to the computing device 130, the customer may select the metrics to monitor. For example, the customer may select the metrics to monitor from a graphical user interface (GUI) that displays the available metrics. In some examples, the customer might obtain more information about the metric before selecting the metric for monitoring. For instance, upon selection of an available metric, a GUI, such as the GUI 335 illustrated in FIG. 3C, may be updated to show actual metric data collected from computing resources executing in the infrastructure defined by the customer (e.g., data from the last five minutes) for the selected metric. In some examples, actual metric data is provided for display before selection, such as in the GUI 325 illustrated in FIG. 3B. In this way, the customer may view actual metrics data obtained from the defined infrastructure in order to assist the customer in determining whether to select the metric for monitoring.

In some configurations, the customer may select to purchase one or more of the available metrics from the GUI. After a metric is purchased by a customer using the computing device 130, the metrics manager 124 may configure the selected metrics 190 for monitoring. For instance, instead of requiring the customer to modify a configuration file, or set some other setting, the metrics manager 124 may configure the configuration file (or other settings) on behalf of the customer. In some configurations, the configuration data for the monitoring may be stored within the data configuration data 184 in the data store 128 and/or at some other location. For instance, the metrics manager 124 may provide the data indicating what metrics to monitor directly to one or more collection components 135. According to some examples, the metrics manager 124 may instruct one or more of the collectors 135 to load a plugin that supports collecting metric data 126 of a selected metric. For example, if the collector 135A on the server 170A does not already have a plugin loaded to support the collection of metric data 126 for a selected metric 190 associated with the resources 130A, the metrics manager 124 may instruct the collector 135A to load the plug in that supports the collection. In other examples, the collector 135A may load the plugin in response to the change in configuration settings that specify the metrics to monitor.

The collection components 135 are operative to collect metrics data 126 associated with the resources 130 executing on computing devices. In the current example, collector 135A is configured to collect metrics data 126 associated with the resources 130A on the server 170A. Collectors 135B-135C are configured to monitor metrics associated with the resources 130B-130C on the server 170B. For example, collector 135B may be configured to collect metrics data 126 for resource 130B and collector 135C may be configured to collect metrics data 126 for resource 130C. Collector 135D is configured to collect metrics data 126 for the resource 130d on the server 170C.

In some configurations, the selected metrics 190 are monitored by a systems statistics collection daemon, such as the "Collectd" systems statistics collection daemon. In Collectd there are over 90 plugins that support different software products and the monitoring of many different types of metrics. Other monitoring technologies may be utilized. For example, some metrics may be monitored by an operating system associated with the resources 130, other metrics may be monitored by a software product 152, and the like. In some cases, the collectors 135 may be implemented in software and/or hardware. According to some configurations, the collectors are placed on a same server 170 as the resources being monitored are located.

As briefly discussed above, some of the metrics that are available for monitoring may be provided by a third party metric provider. For example, a software provider of a software product operative to monitor metrics within the service provider network 120 may make available for purchase the metrics by customers of the service provider network. For example, the metrics associated with a third party software product may be made available by the third party metric provider for use and purchase by customers of the service provider network 120. In some configurations, the third party metric provider may utilize the computing device 130 to provide the metrics to the metrics manager 124. The metrics manager 124 may make the metrics provided the third party metric provider available for purchase in a marketplace, such as the electronic marketplace 160. In this way, customers of the service provider network 120 may purchase metrics provided by third party metric providers and/or metrics provided by the service provider network 120, or some other user or customer.

The metric data 126 may be obtained at various times. For example, the metric data 126 may be obtained periodically, at specified times, in response to an event, or in response to some other condition. In some examples, the customer may specify how often the monitoring of a metric is to be performed (e.g., every minute, two minutes). Additional details regarding selecting and configuring metrics are provided below.

Figure 2:
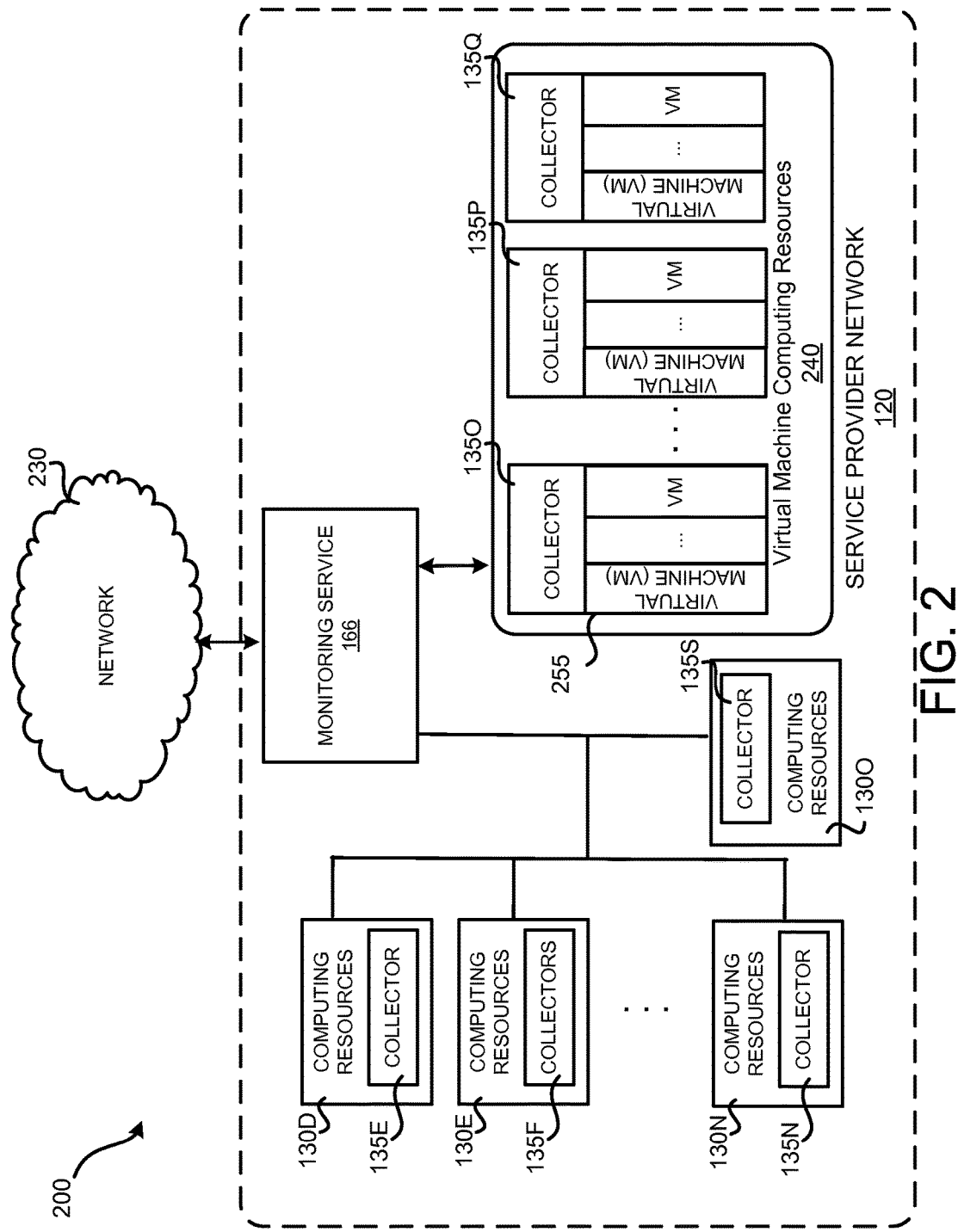
FIG. 2 is a network architecture diagram showing aspects of one illustrative mechanism described herein for monitoring metrics for computing resources within a service provider network.

FIG. 2 is a network architecture diagram showing aspects of one illustrative mechanism described herein for monitoring metrics for computing resources within a service provider network 120. As illustrated, the service provider network 120 is a network in which customers can purchase and utilize computing resources, such as the computing resources 130D-130O, the virtual machine computing resources 240 including virtual machine instances ("VMs"). These different resources may be referred to as "resources" or individually as a "resource".

Each type or configuration of a resource may be available from the service provider that operates the service provider network 120 in different sizes and/or configurations. For example, a service provider might offer virtual machine computing resources 240 (e.g., VM instances or other types of data processing resources that are available for purchase and use that may have different configurations of processor capabilities, main memory, disk storage and operating systems). A service provider might also offer other types of resources, such as computing resources 130D-130O for purchase and use by customers. For example, a service provider might offer database resources, file or block data storage resources and/or networking resources, such as load balancing resources, domain name service ("DNS") resources, virtual networking resources and/or other types of resources on a permanent or as-needed basis. As discussed above, the resources might also include resources (e.g., software products 152) that are provided by the service provider and/or third party software providers. For example, a third party software provider might offer database resources, file or block data storage resources and/or networking resources, such as load balancing resources, networking resources and/or other types of resources on a permanent or as-needed basis.

The resources 130 may be provided in one particular implementation by one or more data centers operated by the service provider. Data centers are facilities utilized to house and operate computer systems and associated components. Data centers typically include redundant and backup power, communications, cooling and security systems. The data centers may be located in different geographical locations, and may be connected to various other facilities, such as co-location facilities, and various networks (e.g., the Internet), such as the network 230.

In the environment shown in FIG. 2, a service provider might operate one or more data centers configured to provide the resources in the service provider network 120 to its customers. While a single service provider network 120 is shown in FIG. 2, the service provider network 120 might include many different networks that are in geographically disparate locations. Exemplary details regarding the implementation of a service provider network 120 for providing the functionality disclosed herein is described below with regard to FIGS. 6 and 7.

According to an example, resources in the service provider network 120 are provisioned and de-provisioned as needed in an automated fashion. For example, a customer might submit a request to the service provider network 120 to instantiate a computing resource, such as an instance of a virtual machine using virtual machine computing resources 240. In response to receiving such a request, a provisioning component (not shown in FIG. 2), or one or more other components within the service provider network 120, might create the new virtual machine instance as requested by the customer. The customer may then be permitted to utilize the new virtual machine instance as desired. The collectors 135 are configured to collect metrics data 126 for at least a portion of the resources executing in the virtual machines 240. Other types of computing resources 130 might be instantiated and utilized in a similar fashion.

When a customer has finished using a computing resource, such as a virtual machine instance, the customer may request that the resource be de-provisioned. In response thereto, a provisioning component or another component in the service provider network 120 may cause the resource to be de-provisioned. Other types of computing resources might also be provisioned and de-provisioned in a similar manner.

As illustrated in FIG. 2, the computing resources 130 in the service provider network 120 may be located near one or more collectors 135, such as collectors 135D-135Q. The collectors 135 may be deployed at one or more locations in the service provider network 120. For example, the collectors 135 may be deployed as network devices, computing resources 130, and/or deployed as software that is located on the network devices, or the computing resources 130. In some examples, more than one collector, such as collectors 135F, may be utilized. For instance, a different collector 135 might be utilized with each different type of computing resources 130 being monitored. As discussed above, a collector 135 may be placed into operation by the monitoring service 166 to collect metrics data 126 for one or more selected metrics 190.

It should be appreciated that the configuration of the service provider network 120 shown in FIG. 2 has been simplified for discussion purposes. A service provider network 120 might include many more hardware and software components than illustrated in FIG. 2 and described above. Additionally, the service provider network 120 might include many other components, such as networks, networking components, data stores and other components than those specifically identified herein.

Turning now to FIGS. 3A-3D, different examples of graphical user interfaces ("GUIs") are illustrated that display data relating to metrics that may be monitored. The GUIs that are presented are for illustrative purposes only, and are not intended to be limiting.

Figure 3A:
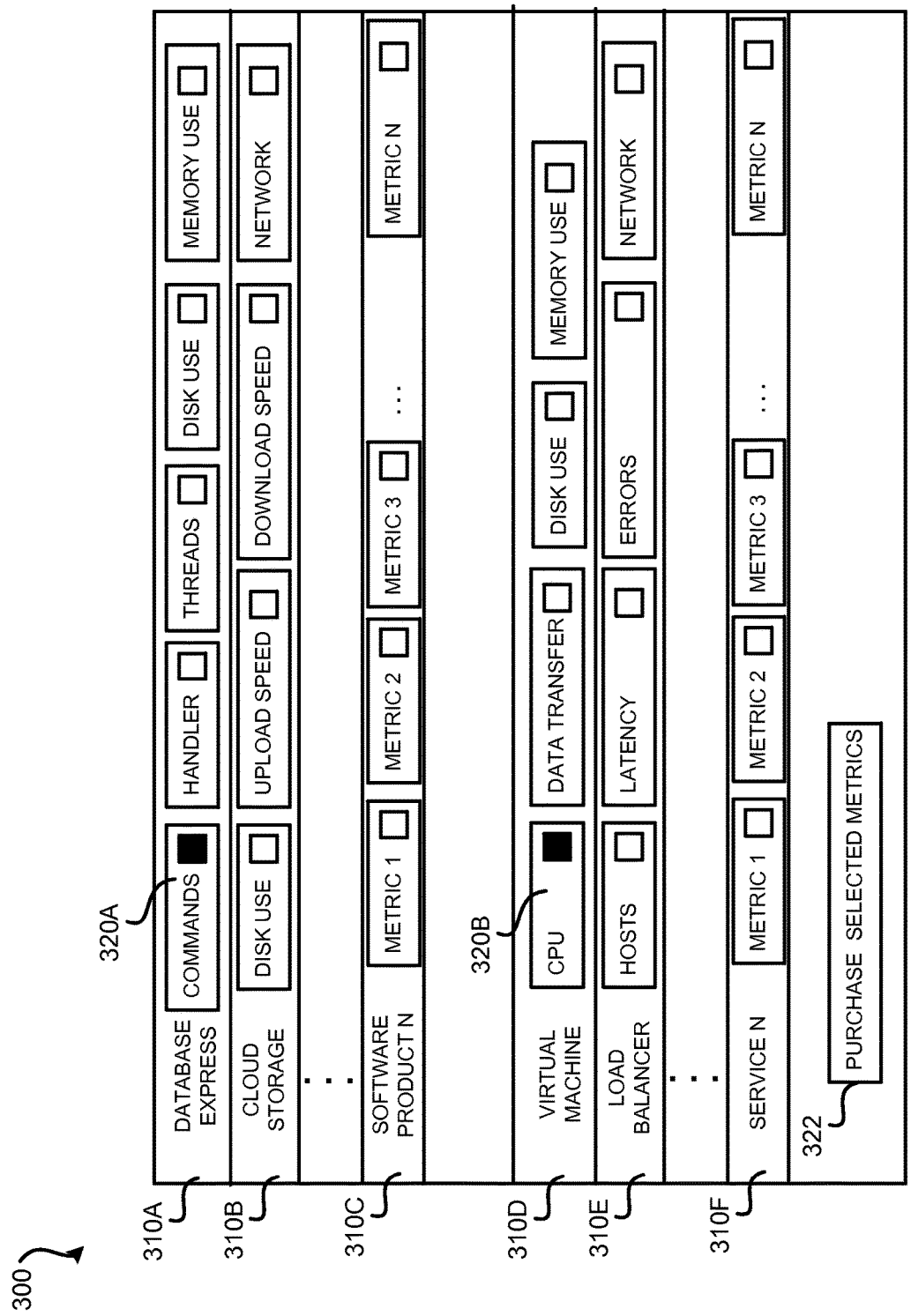
FIG. 3A is a screen diagram showing an illustrative GUI that displays metrics that are available for monitoring.

FIG. 3A is a screen diagram showing an illustrative GUI 300 that displays metrics that are available for monitoring. The GUI 300 may be generated by the metrics manager 124, shown in FIG. 1, and presented on a computing device, such as the computing device 130 by an application, such as a Web browser.

As illustrated, the GUI 300 includes rows corresponding to different software products 152, services and execution environments configured to execute in the service provider network 120. In the current example, the GUI 300 includes a display of a row (e.g., rows 310A-310C) for each software product 152 that is configured by a customer to execute within the service provider network 120. For instance, each software product may be configured to execute within one or more virtual machine instances. In some examples, the software products shown in the GUI 300 are software products that are determined to be executing within the service provider network 120. Rows 310D-310F show execution environments (e.g., virtual machines) and/or services utilized by the customer within the service provider network 120.

In the current example, the GUI 300 shows a row 310A for the database express software product 152, a row 310B for the cloud storage software product 152, a row 310C illustrating the software product N, a row 310D for a virtual machine, a row 310E for a load balancer, and a row 310F for a service N. As can be seen by referring to each of the rows 310A-310F, a customer may view a list of available metrics 188 that may be monitored for each of the software products, services and other resources that are associated with the customer.

Viewing the row 310A that is associated with the database express software product 152, the customer may see that metrics available for monitoring include a commands metric, a handler metric, a threads metric, a disk use metric, and a memory use metric. The metrics that are illustrated are for exemplary purposes and are not intended to be limiting. More or fewer metrics may be associated with a product. Viewing the other rows 310B-310F, the customer may view the metrics that are available with other resources. The customer may select one or more of the metrics to monitor.

According to some configurations, the customer may purchase one or more of the available metrics by selecting the purchase selected metrics user interface element 322. In some examples, the customer may perform a single selection of the purchase selected metrics UI element 322 to purchase and configure the selected metrics. For example, selecting the purchase selected metrics UI element 320B when the command metric 320A and the CPU metric 320B is selected may result in the purchase and configuration of the commands metric and the CPU metric 320B.

In some configurations, the customer might be permitted to obtain more information about a metric. For example, the customer might select one or more of the metrics to obtain more detailed information, as illustrated in FIG. 3C, about a particular metric. In the current example, the customer has selected to view more detailed information about the command metric 320A associated with the database express software product and the CPU metric 320B associated with the virtual machine computing resource.

Figure 3B:
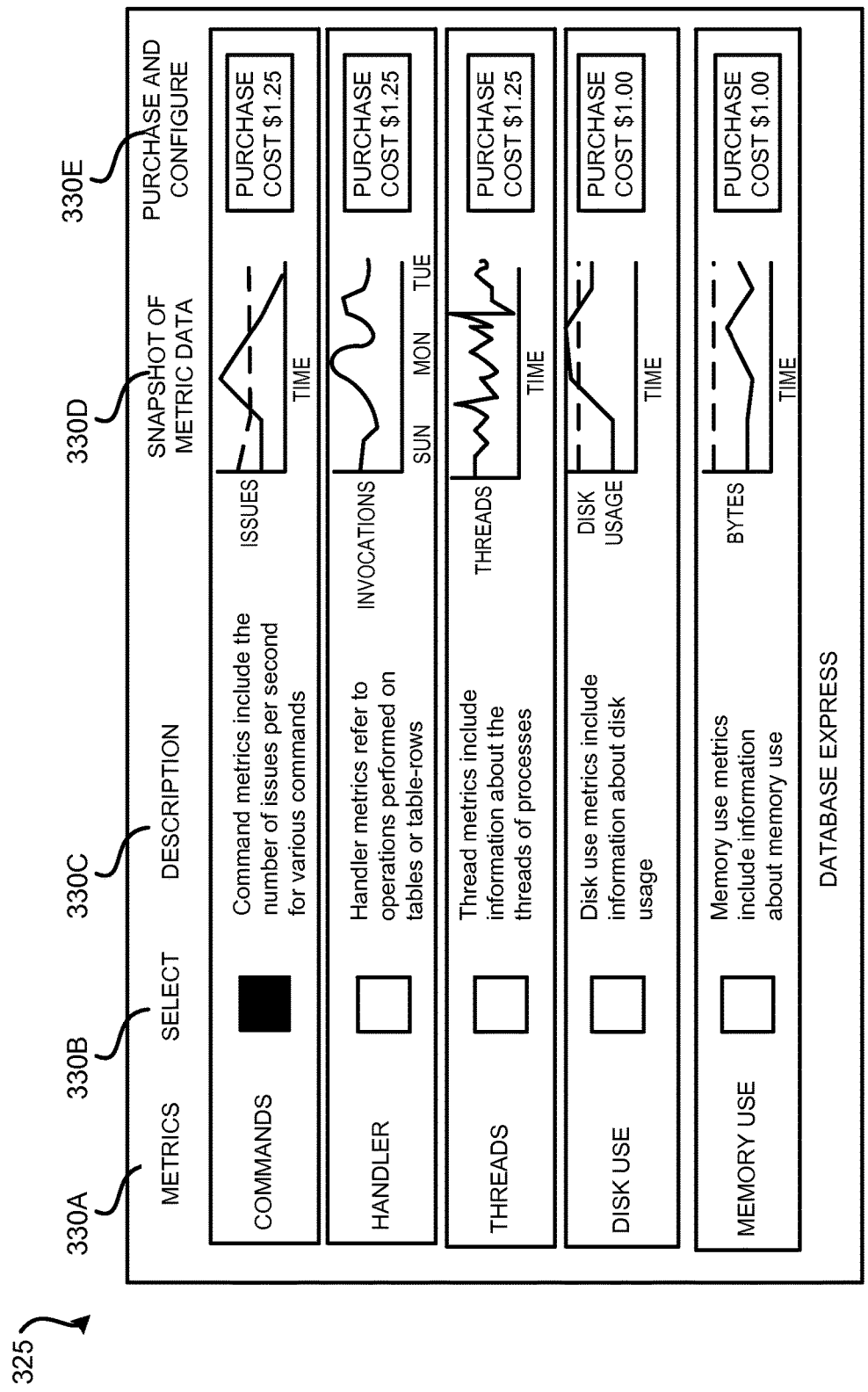
FIG. 3B is a screen diagram showing an illustrative GUI that displays metrics that are available for monitoring along with a snapshot of collected metric data.
Figure 3C:
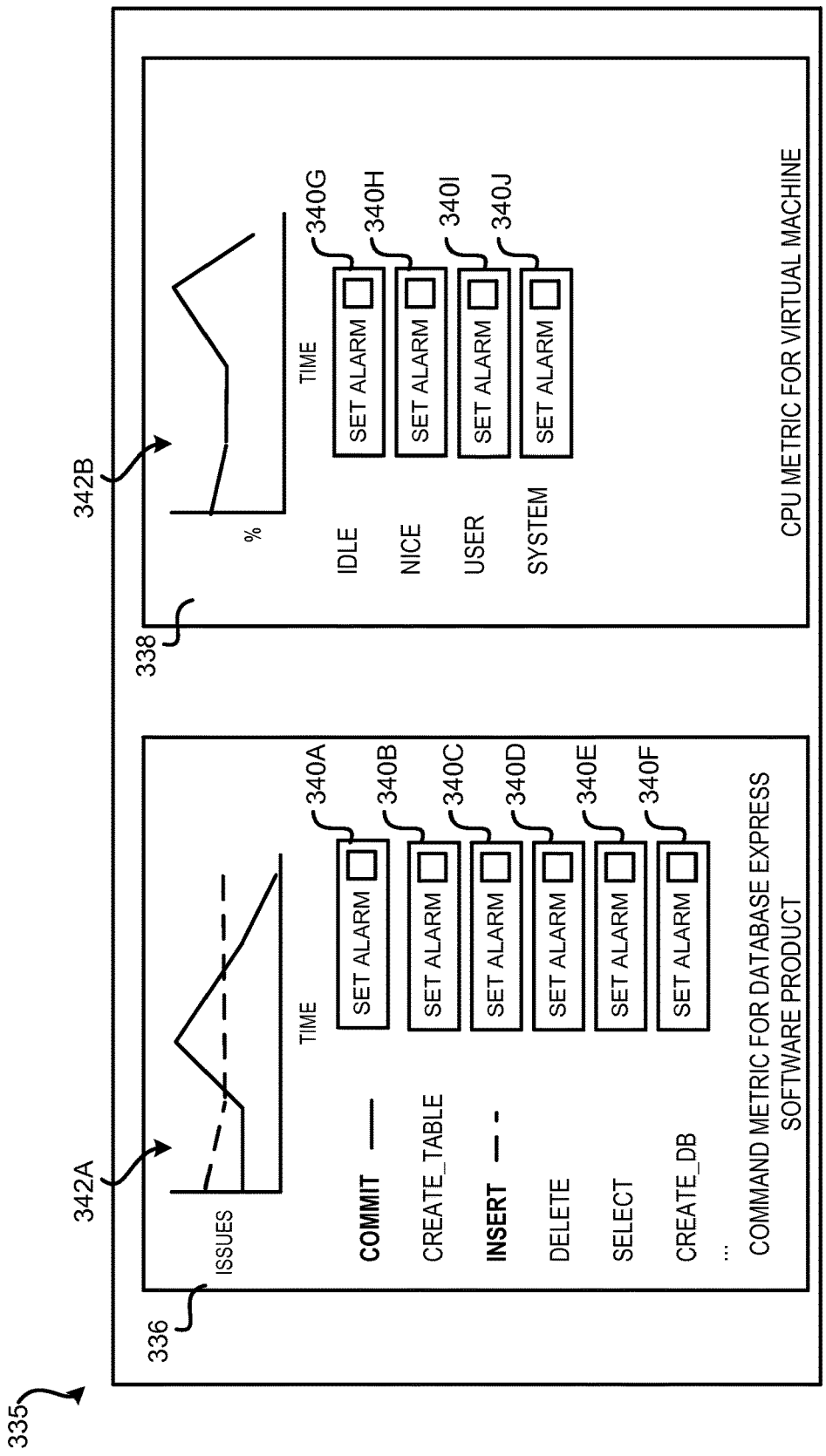
FIG. 3C is a screen diagram showing an illustrative GUI that displays metric data for selected metrics.

FIG. 3B is a screen diagram showing an illustrative GUI 325 that displays metrics that are available for monitoring along with a snapshot of collected metric data. The GUI 325 may be generated by the metrics manager 124, shown in FIG. 1, and presented on a computing device, such as the computing device 130 by an application, such as a Web browser.

As illustrated, the GUI 325 includes rows corresponding to different metrics that are available for monitoring for the "Database Express" software product 152. In the current example, the GUI 325 includes a row for the commands metric, a row for the handler metric, a row for the threads metric, a row for the disk use metric, and a row for the memory use metric. All or a portion of the metrics associated with a software product, or more than one software product may be illustrated in the GUI 325.

In the current example, the GUI 325 shows a metrics name column 320A, a select column 330B, a description column 330C, a snapshot of metric data column 330D, and a purchase and configure column 330E. More or less data may be shown. Generally, the metrics name column 330A provides the name associated with a metric that is available for monitoring. The select column 330B allows a customer to select the metric. The selection may be used to determine what metrics to purchase and/or to provide further information about the metric. The description column 330C provides a brief description of the metric.

The snapshot of metric data column 330D provides a snapshot of metric data collected from resources 130 executing on behalf of the customer. For example, instead of showing exemplary metrics data obtained from some other computing resource, the metrics data shows the customer information about the resources 130 executing on behalf of the customer. Over time (e.g., every 5 minutes or some other time), the data presented in the snapshot of metric data column 330D may be updated.

The purchase and configure column 330E provides UI elements that allow the customer to select a metric for purchase and configuration. In the current example, the price of the metric is also displayed. As discussed above, the customer may purchase an available metrics by selecting a user interface element.

FIG. 3C is a screen diagram showing an illustrative GUI 335 that displays metric data for selected metrics, in accordance with aspects disclosed herein. The GUI 335 may be generated by the metrics manager 124, shown in FIG. 1, and presented on a computing device, such as the computing device 130 by an application, such as a Web browser. In the current example, the GUI 335 shows a commands metric for the "database express" software product 152 within element 336 and a CPU metrics for a virtual machine within element 338.

The GUI 335 might display a variety of different information relating to the selected metrics. In the current example, for the database express software product 152, the GUI 335 shows metrics data that is obtained from a current execution of the database express software product and the virtual machine associated with the customer. For instance, the metric data for the metric may be the last one minute, two minutes, or five minutes of data for an execution within the service provider network 120 that is associated with the customer. In this way, the customer may see example metric data for a metric that might be selected using data obtained from an execution that the customer configured. Stated another way, the metrics data displayed in the GUI 335 may be data associated with the customer, and not some "example" data that is associated with another customer.

As illustrated, the element 336 shows a graph 342A that shows the number of times selected commands have been issued within a specified time (e.g., the last five minutes). In the current example, the customer has selected to view the number of times the "commit" command has been issued and the number of times the "insert" command has been issued in the last five minutes.

The element 338 shows a graph 342B that shows the CPU use for a selected virtual machine within a specified time (e.g., the last five minutes). In the current example, the customer has selected to view the system use of the CPU during the last five minutes.

Also illustrated in the GUI 335 are alarm user interface ("UI") elements 340A-340J that may be utilized by the customer to set one or more alarms. For example, a customer might select UI element 340A to configure an alarm that is triggered when a specified number of commit command occur within the execution of the database express software product. Generally, the thresholds that are utilized by the metric manager 124 to determine whether an alarm is to trigger may be based on user specified settings. In some examples, default values may be set for alarms. For instance, an alarm for memory usage might be set to 90%, such that when the use of memory exceeds 90% the associated alarm is triggered.

Figure 3D:
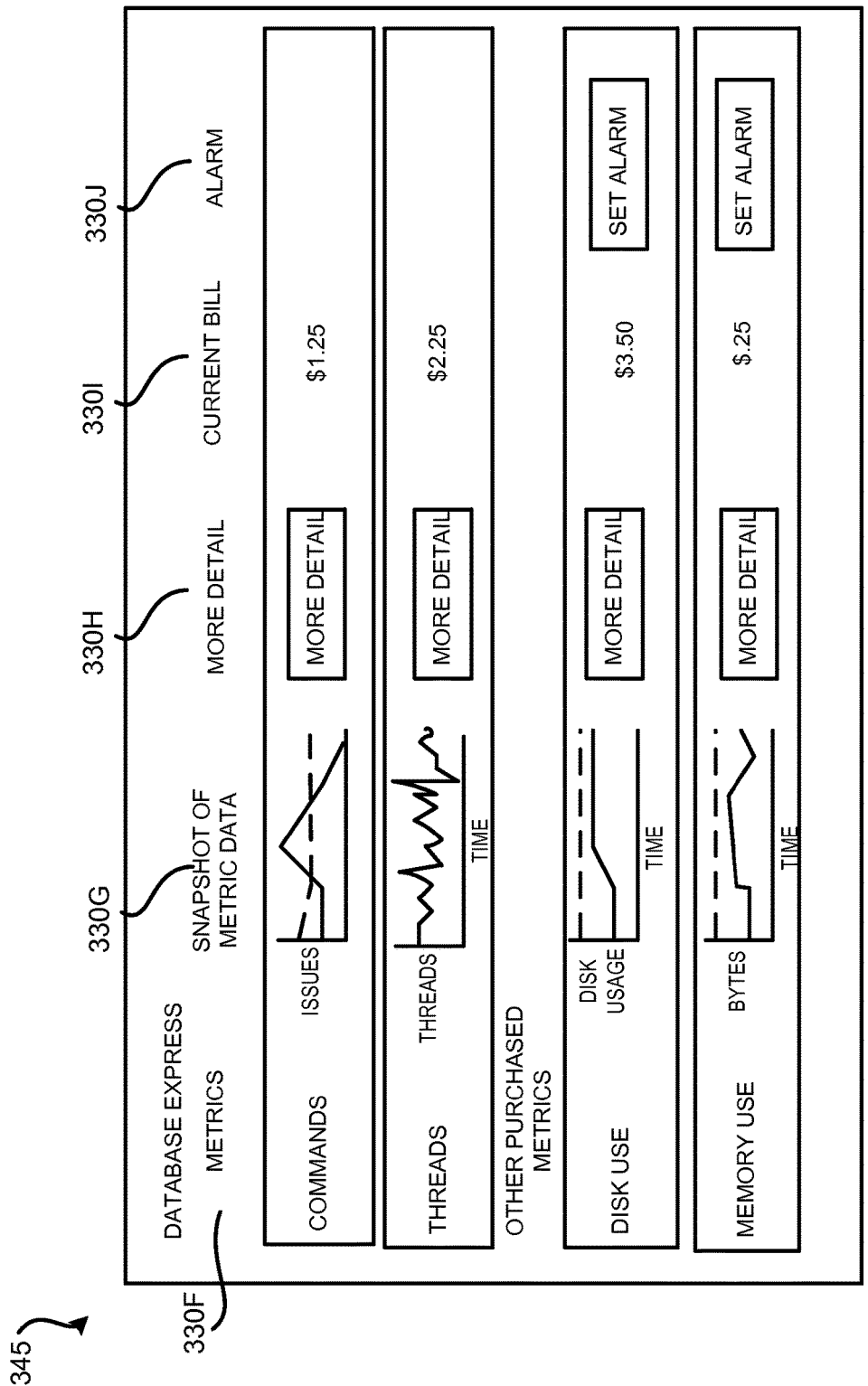
FIG. 3D is a screen diagram showing an illustrative GUI that displays purchased metrics along with a snapshot of collected metric data.

FIG. 3D is a screen diagram showing an illustrative GUI 345 that displays purchased metrics along with a snapshot of collected metric data. The GUI 345 may be generated by the metrics manager 124, shown in FIG. 1, and presented on a computing device, such as the computing device 130 by an application, such as a Web browser.

As illustrated, the GUI 345 includes rows corresponding to different metrics purchased by the customer. In the current example, the GUI 345 includes a row for the commands metric and a row for the handler metric associated with the "Database Express" software product 152, and a disk use metric row and a memory use row associated with one or more other software products.

In the current example, the GUI 345 shows a metrics name column 330F, a snapshot of metric data column 330G, a more detail column 330H, a current bill column 330I, and an alarm column 330J. More or less data may be shown. Generally, the metrics column 330F provides the name for a purchased metric. The snapshot of metric data column 330D provides a snapshot of metric data collected from resources 130 executing on behalf of the customer. The more detail column 330H provides UI elements that when selected provide more detailed metric data 126 for the selected metric. For example, the customer might select the more detail UI element for the commands metric to obtain detailed metrics data 126 for each of the different commands associated with the "Database Express" software product 152.

The current bill column 330I provides the current amount of a bill for a metric. In this way, the customer may see how much the metric is costing on an ongoing basis. The alarm column 330J may provide a set alarm UI element for metrics in which an alarm may be configured without user interaction. For example, some metrics may have default alarm thresholds that are applicable across a wide variety of applications. In other examples, a set alarm UI element may be displayed for each of the purchased metrics.

Figure 4:
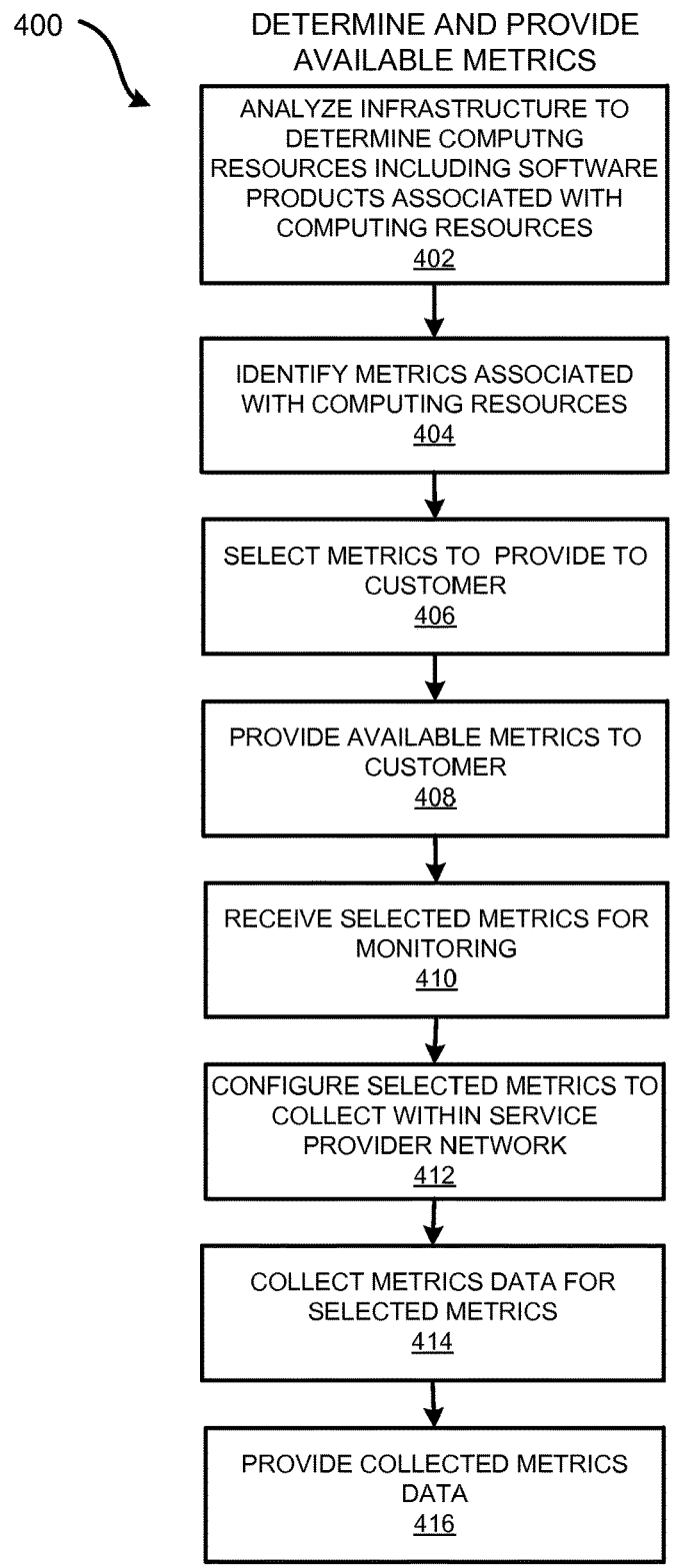
FIG. 4 is a flow diagram showing a routine illustrating aspects of a mechanism disclosed herein for selecting and configuring metrics to monitor within a service provider network.
Figure 5:
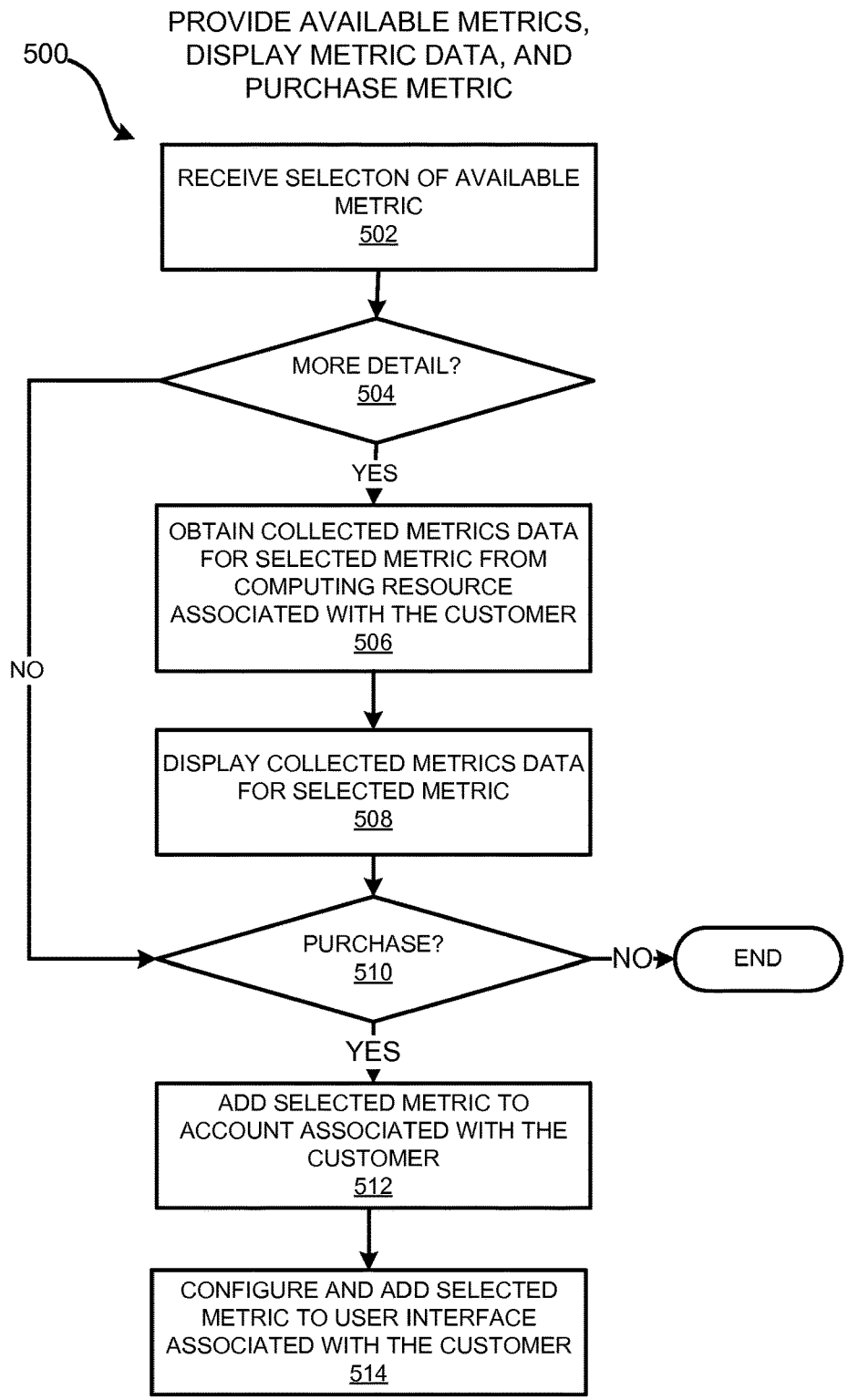
FIG. 5 is a flow diagram showing a routine illustrating aspects of a mechanism disclosed herein for providing example metric data for metrics and purchasing metrics.

FIGS. 4 and 5 are flow diagrams showing routines that illustrate aspects of selecting and configuring metrics to monitor. It should be appreciated that the logical operations described herein with respect to FIGS. 4 and 5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 4 is a flow diagram showing a routine 400 illustrating aspects of a mechanism disclosed herein for selecting and configuring metrics to monitor within a service provider network. The routine 400 may begin at operation 402, where an infrastructure specified by the customer is analyzed to determine the computing resources utilized. As discussed above, the infrastructure defines the computing resources utilized within the service provider network. In some configurations, the infrastructure is dynamically analyzed as the computing resources are executing within the service provider network. For example, the metrics manager 124 in the monitoring service 166 may examine the currently running processes that are associated with the defined infrastructure by the customer. The examination may include an analysis of the contents of memory of one or more computing devices, querying an operating system to request active processes, and the like. In other configurations, configuration data associated with the infrastructure is analyzed to determine the computing resources associated with the infrastructure. For example, the metrics manager 124 may determine the defined resources that are contained within the configuration data for a specified infrastructure.

At operation 404, the metrics associated with the computing resources are identified. As discussed above, the metrics that are associated with the computing resources may be determined using best practice data and/or other data that indicates what metrics may be measured. In some configurations, metrics such as defined by the plugins available for the systems statistics collection daemon "Collectd". In Collectd there are currently over 90 plugins that support different software products and the monitoring of many different types of metrics. Each of these plugins may specify the metrics that are monitored by the plugin. In yet other configurations, the best practices 128 data may be examined to identify metrics to monitor. For example, the best practices data 182 may be examined to determine what metrics are most often (or recommended) to monitor for a particular resource.

At 406, the metrics to provide to the customer are selected. As discussed above, the metrics that are provided to the customer as the available metrics 188 for selection might be all or a part of the metrics that are associated with the computing resources utilized within the infrastructure. The metrics to provide to the customer may selected be selected by the metrics manager 124 using different mechanisms. For example, the available metrics 188 provided to the customer might be based on commonly used metrics, recommended metrics, and the like. For example, the metrics manager 124 may access the best practice data 182 to determine the recommended metrics by a software provider, a reviewing service, the service provider network 120, or some other user familiar with the operation of the computing resource.

As also discussed above, the metrics that are provided may be selected by the metrics manager 124 using customer usage data. For example, metrics that are commonly selected and utilized by other customers within the service provider network 120 may be identified by the metrics manager 124. For example, the metrics manager 124 may identify other customers within the service provider network 120 that utilize all or a portion of the computing resources 130 that the customer utilizes. The metrics manager 124 may then identify what metrics the identified customers are utilizing. The metrics used by other customers may be stored by the metrics manager in the best practices data 182.

According to some configurations, the customer data used by the metrics manager 124 may be based on customers that have a similar profile to the customer. For example, the metrics manager 124 may identify other customers that are in the same type of business (e.g., banking, software-as-a-service, or the like) and determine the metrics that are commonly selected by the identified customers. In some configurations, the metrics manager 124 may select a top number of metrics (e.g., top 10, 20, 50, or the like) from the best practices data 182. In other examples, the metrics manager 124 may select all, or some other portion, of the metrics identified by the best practices data 182.

At 408, the metrics are provided to the customer. As discussed above, a graphical user interface, such as the graphical user interface displayed in FIG. 3A or 3B might be used to display the available metrics determined by the metrics manager 124. In other examples, the available metrics may be provided using different mechanisms. For example, the available metrics may be delivered in a message, stored in a document, delivered in a report, and the like. In some examples, the available metrics might be updated in response to different events. For example, the available metrics might be updated periodically, in response to further use or configuration of the infrastructure, or the like.

At 410, one or more metrics are selected for monitoring. As discussed above, a customer may use the GUI 300 or the GUI 325 to select one or more of the metrics to monitor. In some examples, the customer may select a checkbox, or provide some other indication, to select a metric for monitoring. In other examples, the customer might use a voice interface, or some other interface, to choose the selected metrics 190.

At 412, the selected metrics are configured for monitoring within the service provider network 120. As discussed above, the metrics manager 124 may modify a configuration file, or some other setting, to indicate to begin monitoring of one or more of the selected metric. For example, the metrics manager 124 may change a configuration file associated with a collection daemon. In some examples, after making the change to the configuration file, one or more collectors 135 may be instructed to load a plugin (or activate some software) to begin monitoring of the selected component within one or more execution environments.

At 414, the metrics data for the selected metrics are collected. As discussed above, one or more collectors 135, the monitoring service 166, or some other computing device may collect the metrics data 126. In some examples, the frequency of the collection may be configured by the customer (e.g., every 1 minute, 2 minutes, 10 minutes, whenever a value changes, and the like).

At 416, the collected metrics data 126 associated with the metrics may be provided by the monitoring service 166, the monitoring manager 124, or some other computing device, to the customer, or some other authorized user. As discussed above, a graphical user interface might be used to display the metric data. In other examples, the metric data may be provided using different mechanisms. For example, the metric data may be delivered in a message, stored in a document, delivered in a report, and the like.

FIG. 5 is a flow diagram showing a routine 500 illustrating aspects of a mechanism disclosed herein for providing example metric data for metrics and purchasing metrics. The routine 500 may begin at operation 502, where a selection of a metric is received. As discussed above, the user might select a metric using a GUI, such as the GUI 300 illustrated in FIG. 3A. The selection might be an indication to receive more information about the metric and/or a selection to purchase the metric.

At 504, a determination is made as to whether more detail is requested regarding the selected metric. As discussed above, the more detail might include displaying a description of the metric and exemplary data for the metric. When more detail is not requested, the routine 500 moves to 510. When more detail is requested, the routine 500 moves to 506.

At 506, metric data for the selected metric is obtained. As discussed above, the metric data that is obtained for providing more detail for a selected metric is obtained from computing resources configured and operating under the control of the customer requesting more detail. In some examples, the metric manager 124 accesses the previous five minutes (or some other amount of data) from the infrastructure associated with the customer that is operating within the service provider network 120.

At 508, the metric data for the selected metric is displayed. In some configurations, the metrics data is displayed within a user interface element, such as user interface elements illustrated in FIGS. 3B and 3C. As discussed above, the metric data may provide the customer a glimpse into how the selected metric may be of use to the customer.

At 510, a determination is made as to whether to purchase the metric. For example, the customer may select a "purchase" UI element. When the customer does not desire to purchase the metric, the routine 500 moves to an end operation and may return to processing other actions. When the customer does desire to purchase the metric, the routine 500 moves to 512.

At 512, data identifying the selected metric is added, or otherwise associated, with an account of the customer. In this way, the customer may be charged for receiving the metric data for the selected metric.

At 514, the selected metric is configured and added to a user interface associated with the customer after being purchased. As discussed above, in response to receiving an indication to purchase a metric, the metrics manager 124 may configure the metric and provide access to the collected metrics data 126 within a graphical user interface such as the GUI 345 illustrated in FIG. 3D.

Figure 6:
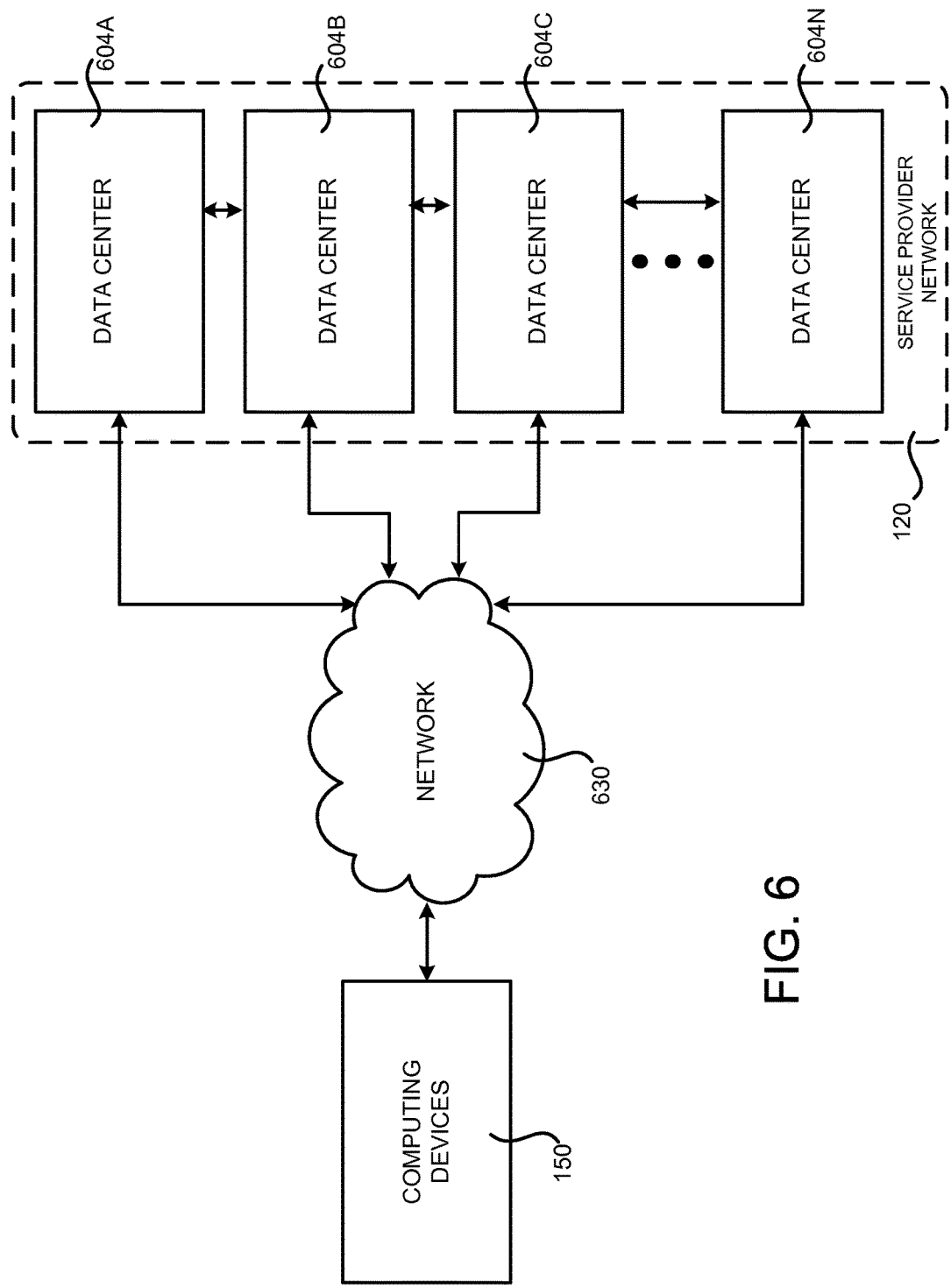
FIG. 6 is a system and network diagram that shows one illustrative operating environment for the examples disclosed herein that includes a service provider network.

FIG. 6 and the following description are intended to provide a brief, general description of a suitable computing environment in which the examples described herein may be implemented. In particular, FIG. 6 is a system and network diagram that shows an illustrative operating environment that includes a service provider network 120. As discussed above, the service provider network 120 can provide virtual machine instances (or other execution environments such as containers) and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein for selecting and configuring metrics for monitoring in the service provider network 120 will be described below with regard to FIG. 7.

The users and customers of the service provider network 120 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the customer computing devices 140, the software provider computing devices 150 may be utilized. It should also be appreciated that combinations of such networks might also be utilized.

Figure 7:
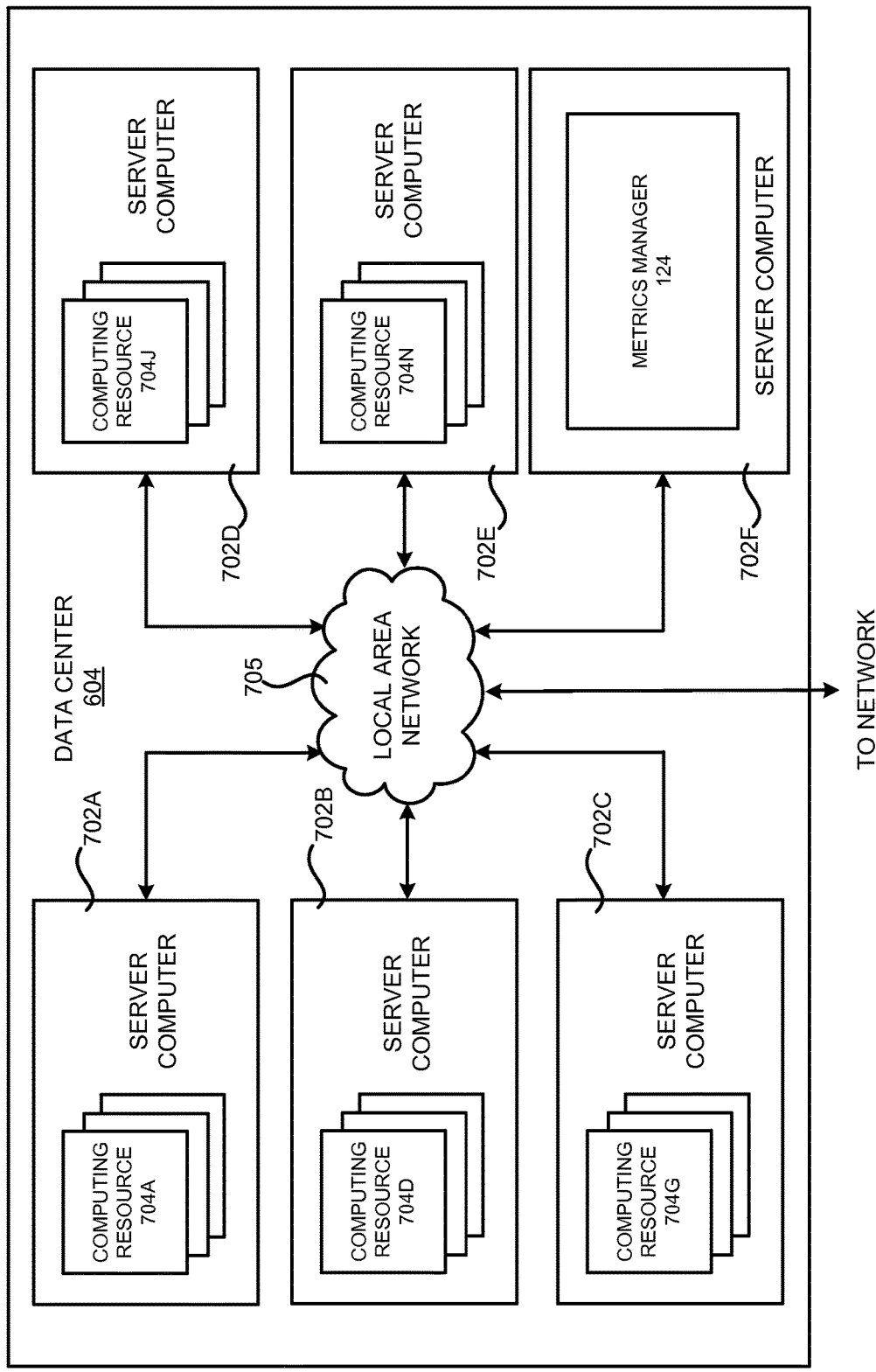
FIG. 7 is a computing system diagram that illustrates one configuration for a data center that implements aspects of a service provider network, including some or all of the concepts and technologies disclosed herein for determining metrics available for monitoring and configuring the metrics for monitoring.

FIG. 7 is a computing system diagram that illustrates one configuration for a data center 604 that implements aspects of a service provider network 120, including some or all of the concepts and technologies disclosed herein for determining metrics available for monitoring and configuring the metrics for monitoring. The example data center 604 shown in FIG. 7 includes several server computers 702A-702F (which may be referred to herein singularly as "a server computer 702" or in the plural as "the server computers 702") for providing computing resources. The server computers 702 may be standard tower or rack-mount server computers configured appropriately for providing the computing resources described herein. According to an example, the server computers 702 are configured to execute the software products as described above.

In one example, some of the computing resources 704 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 120. The server computer 702F might also execute the metrics manager 124 and other components described above. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 604 shown in FIG. 7, an appropriate local area network ("LAN") 705 is utilized to interconnect the server computers 702A-702E and the server computer 702F. The LAN 705 is also connected to the network 630 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 120.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
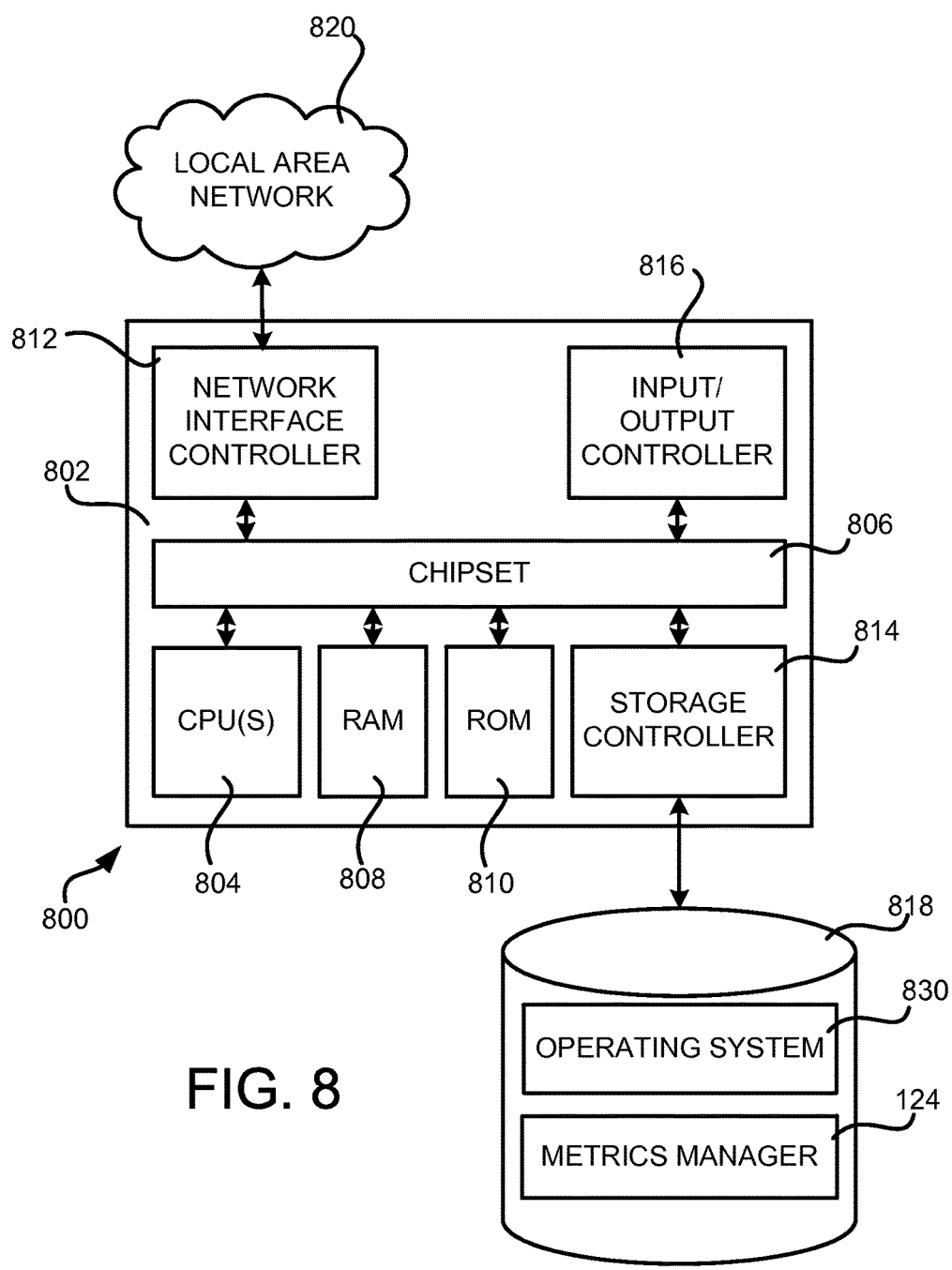
FIG. 8 is a computer architecture diagram showing one illustrative computer hardware architecture for implementing a computing device that might be utilized to implement aspects of the various examples presented herein.

FIG. 8 shows an example computer architecture for a computer 800 capable of executing program components for selecting and configuring metrics in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 140, a software provider computing device 150 or any other of the computing systems described herein.

The computer 800 includes a baseboard 802, or "motherboard," which is a printed circuit board to which a multitude of components or devices may be connected by way of a system bus or other electrical communication paths. In one illustrative example, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the examples described herein.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 818 may store other system or application programs and data utilized by the computer 800, such as components that include the metrics manager 124, the reporting component 126, software product 152 and/or any of the other software components and data described above. The mass storage device 818 might also store other programs and data not specifically identified herein.

In one example, the mass storage device 818 or other computer-readable storage media is encoded with computer-executable instructions that, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various routines described above with regard to FIGS. 4-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for selecting and configuring metrics have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A computer-implemented method, comprising:
   analyzing data, defining an infrastructure, to determine computing resources utilized within a service provider network, wherein the infrastructure is specified at least in part by a customer of the service provider network;
   identifying metrics that are available to monitor, that have yet to be purchased by the customer, and that are associated with the computing resources utilized based at least in part on the data, wherein at least a portion of the metrics are associated with software applications configured to execute within the service provider network;
   collecting metric data for one or more of the metrics, the metric data obtained from one or more of the computing resources executing within the service provider network on behalf of the customer;
   generating a software product user interface (UI) element that indicates at least one of the software applications;
   generating metric UI elements that indicate metrics associated with the at least one of the software applications;
   generating a metric snapshot data UI element that indicates one or more portions of the metric data that are associated with one of the metric UI elements;
   providing the software product UI element, the metric UI elements, and the metric snapshot data UI element for display within a graphical user interface (GUI);
   receiving, from a computing device associated with the customer, an indication of a selection of at least one of the metric UI elements to purchase a metric for monitoring within the service provider network;
   updating an account of the customer associated with the service provider network to reflect a purchase of the metric;
   configuring, on behalf of the customer, one or more computing resources for monitoring of the metric within the service provider network;
   collecting metric data associated with monitoring of the metric within the service provider network; and
   providing for display, the metric data within the GUI.

2. The computer-implemented method of claim 1, further comprising updating a billing record associated with the account in response to monitoring of the metric within the service provider network.

3. The computer-implemented method of claim 1, wherein receiving the indication to purchase the metric for monitoring within the service provider network comprises receiving a selection of a purchase user interface element presented within the GUI.

4. The computer-implemented method of claim 1, wherein generating the metric snapshot data UI element comprises generating a graph that graphically depicts the one or more portions of the metric data.

5. The computer-implemented method of claim 1, wherein configuring, on behalf of the customer, the monitoring of the metric within the service provider network comprises modifying a configuration of one or more computing devices within the service provider network, the one or more computing devices utilized to execute at least one of the computing resources.

6. The computer-implemented method of claim 1, further comprising displaying an alarm user interface element within the GUI, the alarm user interface element associated with one or more alarms related to the monitoring of the metric.

7. A system, comprising:
one or more computing devices configured to operate in a service provider network, the one or more computing devices further configured to
analyze data, defining an infrastructure, to determine computing resources utilized within a service provider network, wherein the infrastructure is specified at least in part by a customer of the service provider network;
identify metrics associated with the computing resources utilized based at least in part on the data, wherein at least a portion of the metrics are associated with one or more software applications configured to execute within the service provider network;
collect metric data for one or more of the metrics, the metric data obtained from one or more of the computing resources executing within the service provider network on behalf of the customer;
generate a software product user interface (UI) element that indicates at least one of the one or more software applications;
generate metric UI elements that indicate metrics associated with the at least one of the one or more software applications;
generate a metric snapshot data UI element that indicates one or more portions of the metric data that are associated with one of the metric UI elements;
provide the software product UI element, the metric UI elements, and the metric snapshot data UI element for display within a user interface (UI);
receive, from a computing device associated with the customer of the service provider network, an indication of a selection of the one of the metric UI elements to purchase one or more of the metrics available to monitor at least one of the computing resource within the service provider network;
update an account of the customer to reflect a purchase of the one or more metrics;
configure, on behalf of the customer, one or more computing resources for monitoring the one or more metrics within the service provider network; and
provide for output, at least a portion of the metric data associated with monitoring of the one or more metrics.

8. The system of claim 7, wherein the one or more computing devices are further configured to provide for presentation within the user interface, on the computing device associated with the customer, an indication that the at least one of the metric UI elements is selected.

9. The system of claim 7, wherein generating the metric snapshot data UI element comprises generating a graph that graphically depicts the one or more portions of the metric data.

10. The system of claim 7, wherein the one or more computing devices are further configured to update a billing record associated with the account in response to monitoring of the one or more metrics within the service provider network.

11. The system of claim 7, wherein the one or more computing devices are further configured to receive, from a computing device associated with a third-party metric provider, at least one of the one or more metrics available to monitor and to make the at least one of the one or more metrics available to monitor available for purchase from a marketplace affiliated with the service provider network.

12. The system of claim 7, wherein provide for output at least the portion of the metric data comprises providing for display a graph that depicts the at least the portion of the metric data.

13. The system of claim 7, wherein the one or more computing devices are further configured to provide for display monitoring data obtained from at least a portion of the one or more of the computing resources executing within the service provider network on behalf of the customer.

14. The system of claim 7, wherein the one or more computing devices are further configured to provide for display an alarm user interface element associated with one or more alarms related to the monitoring of the one or more computing resource, the alarm user interface displayed after receiving the indication to purchase the one or more metrics.

15. The system of claim 7, wherein the one or more computing devices are further configured to add an indication of the purchase of the one or more metrics within a display of a graphical user interface (GUI), the GUI including a display of at least a portion of the metric data.

16. A non-transitory computer-readable storage medium having computer-executable instructions stored thereupon which, when executed by a computer, cause the computer to:
analyze data, defining an infrastructure, to determine computing resources utilized within a service provider network, wherein the infrastructure is specified at least in part by a customer of the service provider network;
identify metrics available to monitor that are associated with the computing resources utilized based at least in part on the data, wherein at least a portion of the metrics are associated with one or more software applications configured to execute within the service provider network;
collect metric data for one or more of the metrics, the metric data obtained from one or more of the computing resources executing within the service provider network on behalf of the customer;
generate a software application user interface (UI) element that indicates at least one of the one or more software applications;
generate metric UI elements that indicate metrics associated with the at least one of the one of the one or more software applications;
generate a metric snapshot data UI element that indicates one or more portions of the metric data that are associated with one of the metric UI elements;
provide the software product UI element, the metric UI elements, and the metric snapshot data UI element for display within a user interface (UI);
receive, from a computing device associated with the customer, an indication of a selection of at least one of the metric UI elements to purchase a metric from the metrics identified to be available for monitoring;
update an account of the customer, associated with the service provider network, to reflect a purchase of the metric;

configure, on behalf of the customer, one or more computing resources for monitoring the metric within the service provider network; and provide for output, at least a portion of the metric data associated with monitoring of the metric.

17. The non-transitory computer-readable storage medium of claim 16, wherein the instructions further cause the computer to provide for presentation within the user interface an indication that the at least one of the metric UI elements is selected.

18. The non-transitory computer-readable storage medium of claim 16, wherein generate a metric snapshot data UI element comprises generating a graph that graphically depicts the one or more portions of the metric data.

19. The non-transitory computer-readable storage medium of claim 16, wherein provide for output, the at least the portion of metric data comprises providing for presentation within a graphical user interface, in response to a selection of the metric.

20. The non-transitory computer-readable storage medium of claim 16, wherein the instructions further cause the computer to add an indication of the purchase of the metric within a display of a graphical user interface (GUI), the GUI including a display of at least a portion of the metric data.

* * * * *